United States Patent
Joshi et al.

(10) Patent No.: US 12,368,695 B2
(45) Date of Patent: Jul. 22, 2025

(54) COMPACTING TRAFFIC SEPARATION POLICIES IN CAMPUS NETWORKS

(71) Applicant: HEWLETT PACKARD ENTERPRISE DEVELOPMENT LP, Spring, TX (US)

(72) Inventors: Vinayak Joshi, Bangalore (IN); Venkata Varadhan Devarajan, Bangalore (IN); Rajib Majila, Bengaluru (IN); Sathyanarayana Gopal, San Jose, CA (US); Hari Anil Kumar, San Francisco, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 194 days.

(21) Appl. No.: 18/161,171

(22) Filed: Jan. 30, 2023

(65) Prior Publication Data

US 2024/0259346 A1    Aug. 1, 2024

(51) Int. Cl.
*H04L 29/00*     (2006.01)
*H04L 9/40*      (2022.01)

(52) U.S. Cl.
CPC ...... *H04L 63/0254* (2013.01); *H04L 63/0245* (2013.01); *H04L 63/104* (2013.01)

(58) Field of Classification Search
CPC ............. H04L 63/0254; H04L 63/0245; H04L 63/104
See application file for complete search history.

(56) References Cited

U.S. PATENT DOCUMENTS

| | | | | |
|---|---|---|---|---|
| 7,523,493 B2* | 4/2009 | Liang | ...................... | H04L 63/20 726/13 |
| 7,877,781 B2* | 1/2011 | Lim | ........................ | H04L 63/10 726/1 |
| 8,244,909 B1* | 8/2012 | Hanson | .................... | H04L 45/12 711/216 |
| 8,316,435 B1* | 11/2012 | Varadhan | ................ | H04L 45/60 726/2 |
| 8,458,769 B2* | 6/2013 | Dilley | ..................... | H04L 67/10 726/2 |
| 8,762,412 B2* | 6/2014 | Lim | ..................... | H04L 41/0893 709/229 |
| 8,875,218 B2* | 10/2014 | Lim | .................... | G06F 11/3438 713/153 |
| 9,118,689 B1* | 8/2015 | Apte | ....................... | H04L 63/08 |

(Continued)

*Primary Examiner* — Don G Zhao
(74) *Attorney, Agent, or Firm* — Jones Robb PLLC (57) ABSTRACT

A system for compacting traffic separation policies in campus networks, the system comprising an access layer switch and a campus border switch. The access layer switch is configured to receive a definition of one or more policies; responsive to receiving a packet, determine whether any of the policies apply to the packet; responsive to determining that none of the policies apply, cause a tag to be inserted into a communication header of the packet and forward the packet; and responsive to determining that one of the policies applies, forward or drop the packet according to the applicable policy and omit the tag. The campus border switch is configured to, responsive to receiving a packet from the access layer switch, determine whether the packet includes the tag, and responsive to determining that the packet includes the tag, apply a traffic separation policy associated with the tag to the packet.

20 Claims, 8 Drawing Sheets

(56) References Cited

U.S. PATENT DOCUMENTS

| | | | |
|---|---|---|---|
| 10,419,496 B2 * | 9/2019 | Panchalingam | H04L 45/7453 |
| 11,070,522 B1 * | 7/2021 | Maharia | H04L 41/0894 |
| D942,677 S * | 2/2022 | Walker | D27/162 |
| 11,240,256 B2 * | 2/2022 | Bania | H04L 63/1425 |
| 2009/0016226 A1 * | 1/2009 | LaVigne | H04L 63/1408 |
| | | | 370/241 |
| 2010/0186062 A1 * | 7/2010 | Banti | G06F 21/6263 |
| | | | 726/1 |
| 2012/0016721 A1 * | 1/2012 | Weinman | G06Q 30/0206 |
| | | | 705/7.35 |
| 2014/0337500 A1 * | 11/2014 | Lee | H04L 41/12 |
| | | | 709/223 |
| 2015/0143504 A1 * | 5/2015 | Desai | H04L 63/0245 |
| | | | 709/224 |
| 2015/0312134 A1 * | 10/2015 | Kapadia | H04L 45/02 |
| | | | 370/255 |
| 2016/0094480 A1 * | 3/2016 | Kulkarni | H04L 47/2441 |
| | | | 370/230 |
| 2016/0380886 A1 * | 12/2016 | Blair | H04L 45/50 |
| | | | 370/254 |
| 2017/0289190 A1 * | 10/2017 | Kominar | H04L 63/1433 |
| 2017/0366506 A1 * | 12/2017 | Panchalingam | H04L 65/1104 |
| 2018/0006954 A1 * | 1/2018 | Arora | H04W 4/70 |
| 2018/0219875 A1 * | 8/2018 | Bania | H04L 63/1425 |
| 2019/0109714 A1 * | 4/2019 | Clark | H04L 67/565 |
| 2019/0311149 A1 * | 10/2019 | Margel | G06F 21/6218 |
| 2020/0213154 A1 * | 7/2020 | Han | H04L 45/08 |
| 2020/0213156 A1 * | 7/2020 | Cheng | H04L 12/5601 |
| 2020/0213224 A1 * | 7/2020 | Cheng | H04L 12/4645 |
| 2020/0213225 A1 * | 7/2020 | Han | H04L 47/829 |
| 2021/0021471 A1 * | 1/2021 | Jayaraman | G06F 9/45558 |
| 2021/0036991 A1 * | 2/2021 | Owens | H04L 63/126 |
| 2021/0173935 A1 * | 6/2021 | Ramasamy | G06F 21/577 |
| 2021/0392167 A1 * | 12/2021 | Sweeney | H04L 63/0236 |
| 2023/0139002 A1 * | 5/2023 | Zhang | H04L 63/1408 |
| 2024/0244000 A1 * | 7/2024 | Joshi | H04L 45/12 |

* cited by examiner

COMPACTING TRAFFIC SEPARATION POLICIES IN CAMPUS NETWORKS

BACKGROUND

In campus or enterprise networks, it is common to have network segmentation policies (traffic separation policies) where some users are allowed access to intra-enterprise destinations and/or a limited set of external websites/hosts/IP subnets while being denied access to other internal and/or external destinations. In some instances, network segmentation policies may be enforced with respect to a group of users (sometimes grouped together under a "role" umbrella). For example, it may be desired for users having certain roles to be allowed access to only a limited set of internal/external websites/hosts/IP subnets while users having other roles may be allowed unlimited access to all locations. Such policies may be referred to as group-based or role-based policies. In campus networks, network segmentation policies often are enforced at access layer switches.

BRIEF DESCRIPTION OF THE DRAWINGS

Various examples will be described below with reference to the following figures.

Throughout the drawings, identical reference numbers designate similar, but not necessarily identical, elements. Moreover, the drawings provide examples and/or implementations consistent with the description; however, the description is not limited to the examples and/or implementations provided in the drawings.

DETAILED DESCRIPTION

Some network fabrics may have a layered architecture in which the network fabric has an access layer and a border layer, and in some cases also an intermediate layer between the access layer and border layer, wherein clients are connected to the network fabric by the access layer, the network fabric is connected to other networks or fabrics by the border layer (e.g., a campus border gateway/switch), and inter-fabric communications are handled by the access layer and/or the intermediate layer. The other networks that the border layer is connected to may comprise external networks, such as the internet, or networks that are owned and/or controlled by the same entity as the network fabric (referred to herein as "internal networks"), such as a remote branch network. For example, a first campus network fabric may comprise a campus border switch and an access layer, with the border switch connecting the first campus network fabric to a variety of other internal and external networks. As noted above, it may be desired in some circumstances to apply various segmentation rules to communications, some of which may be based on the destination of the communication (e.g., whether the communication is destined to an external site or internal site), but in a layered network, this may be difficult, as the access layer devices that generally apply such rules may not have the information needed to make such determinations.

In some cases, it may be desired that users having certain roles do not have access to users having other specific roles. For example, it may be desired that users having the role of "intern" are not permitted to send traffic to users having the role of "engineer". Such a role-based network segmentation policy needs to be enforceable by the access layer switches coupled with the respective computing devices of users having the role of "intern" and users having the role of "engineer." For instance, if a first computing device in a campus network is associated with an "intern" user and a second computing device in the campus network is associated with an "engineering" user, the access layer switches associated with both devices need to know the roles of the users associated therewith in order to enforce the role-based network segmentation policy. However, as there typically are a large number of access layer switches in a campus network, in order to keep expenses associated with the network reasonable, the access layer switches generally are not very complex and have limited hardware resources. As such, it is typically not a cost-effective solution for each access layer switch in a campus network to be programmed with the role of each networked computing device in the network, as would be required for the enforcement of a role-based policy network segmentation policy. Similarly, such a solution presents a scalability issue as the number of networked computing devices is often in the thousands, if not higher. Instead, each access layer switch is aware of only the roles of users of computing devices that are directly coupled with the switch. Returning to the above example, this means that the access layer switch associated with the first computing device is aware of the "intern" role associated with the user of the first device but not with the "engineering" role associated with the user of the second computing device. Similarly, the access layer switch associated with the second computing device is aware of the "engineering" role associated with the user of the second device but not with the "intern" role associated with the user of the first computing device. Thus, if the first computing device attempts to send a packet(s) to the user of the second computing device, neither the access layer switch associated with the first device nor the access layer switch associated with the second device has an awareness of the roles of the users associated with both computing devices and, accordingly, neither switch is aware that the packet should not be permitted to be sent from the first computing device to the second computing device. Accordingly, the role-based network segmentation policy will be unenforced.

To address this network segmentation issue, all access layer switches configured to send and/or receive packets from the network computing devices in a campus network are programmed with the role-based group segmentation policy. Additionally, a group source tag (also known as a Group Policy Object (GPO) tag) configured to identify the role of a packet source (in this case, the role of the user of the first computing device) is inserted into the communication header of packets at the access layer switch that is coupled with the packet source. In some implementations, if the packet is encapsulated using the Virtual extensible Local Area Network (VXLAN or VxLAN) encapsulation protocol, the group source tag may be inserted into any of the reserved or unused bits within the header. Thus, in the above example, the "intern" role of the user associated with the first computing device may be inserted, by the access layer switch associated with the first computing device, into the header of any packets sent from the first computing device. If the packet is received by the access layer switch associated with the second computing device that is destined for the "engineering" user of the second computing device, the access layer switch associated with the second device will read the group source tag and become aware that the user is an "intern" user. The access layer switch associated with the second computing device also will read the network segmentation policy programmed therein, will be aware of the "engineering" role of the user associated with the second computing device, and will drop the packet in accordance with the policy. Accordingly, the role-based network segmentation policy will be enforced.

While an effective solution for implementing role-based network segmentation of purely local traffic (e.g., packets sent among networked computing devices without passing through a campus border switch), the above-described approach does not allow for the effective implementation of other desired segmentation policies that involve non-local traffic (e.g., packets that pass through the campus border switch) and that allow or deny packets based on their ultimate destination. For example, it may be desired to implement a policy that allows or denies packets sent by devices having certain roles based on whether the packets are destined for an internal destination (i.e., an intra-enterprise destination) or an external destination (i.e., a destination that is not capable of being controlled and/or monitored by the enterprise), with or without specified exceptions. For example, a blanket external traffic denial policy may, when applicable, deny all traffic that is destined for external destinations, except for destinations that are explicitly specified as approved. For instance, such a network segmentation policy could indicate that while packets may be sent from a networked security camera to internal destinations, no traffic is to be sent from a networked security camera to external destinations.

One major difficulty with applying such destination-based network segmentation policies for non-local traffic—particularly for blanket external traffic denial policies—is that the logic applied at the access layer switches is generally not capable of distinguishing between internal destinations and external destinations. The access layer switches do know the destination of each packet, but they don't know whether that destination is internal or external. Without the ability to distinguish internal from external destinations, it may not be possible to program a policy rule that is based on internal/external distinctions into the access layer switches, such as a blanket external traffic denial rule that denies all traffic to external destinations other than specified exceptions. The specifying of any allowed external destinations (for instance, there may be an exception to the above network segmentation policy that permits traffic to be sent from networked security cameras to xyzsecurity.com) generally is not a problem, as this set is typically relatively small and therefore each allowed destination can be explicitly programmed as an exception into the logic of the access layer switch. However, the remainder of the policy—the catch-all denial of all other external destinations—cannot be programmed in the access layer switch logic if the access layer switches cannot distinguish which traffic is external and which traffic is internal. Moreover, it is not feasible to program into the switch explicit denial rules individually specifying each forbidden external destination. Doing so would present not only a scalability issue, as there may be thousands of potential locations for which traffic may be forwarded within a campus network, but it can also create an unfeasibly expensive solution as the switches associated with the access layer are often not complex enough to store and apply a large number of traffic restriction policies.

While it may be theoretically possible to add capabilities to distinguish internal vs external destinations in access layer switches, doing so would bring in configuration complexity and demand large-scale policy enforcement hardware resources (e.g., larger Ternary Content-Addressable Memory (TCAM), more or stronger CPUs, etc.) in the access layer. Thus, attempting to provide the access layer with the ability to distinguish internal and external destinations may be difficult or costly. As noted above, it is generally desired for access layer switches to be relatively inexpensive and simple, and thus such costly and difficult modifications to such switches may not be desirable or feasible.

The present disclosure addresses the issues above by providing a method that compacts or simplifies the configuration regarding traffic separation policies by distributing aspects of the policy enforcement between both access layer switches and border switches in campus network architectures without requiring additional policy hardware resources. For example, examples disclosed herein may allow for a blanket external traffic denial policy to be effectively implemented by processing exceptions to the policy at the access layer and processing the catch-all denial portion of the policy at the border layer. In particular, a definition of one or more policies may be received at an access layer switch (e.g., one of access layer switches A1-A4 of FIG. 1). The input definition of the policies may comprise a role associated with the policies such that traffic from sources (e.g., the client device and/or the user of the client device) having the specified role will have the policy applied. The policies may include various ordinary role-based policies, such as rules preventing traffic sent from one role to another role (e.g., the intern and engineer example described above), rules explicitly specifying the internal and/or external locations to which a packet originating therefrom may be forwarded (e.g., the aforementioned exceptions to the blanket external denial policy), or other rules. In addition to these more ordinary policies, the access layer switch may also be programmed with a special traffic separation policy. When applied to a packet, the special traffic separation policy may cause the access layer switch to tag the packet and forward it to the border layer switch(es). The special policy may be applied to a packet only when one of the other policies is not applicable to the packet. Thus, for example, if a packet is explicitly indicated as allowed according to one of the other policies (e.g., the packet originated from a user associated with security camera SC1 of FIG. 1 and is destined for xyzsecurity.com), then it is forwarded without the tag, if a packet is explicitly denied by one of the other policies, then it is dropped, and if a packet is not covered by one of the other policies, then the packet is forwarded with the tag.

The border layer switch(es) (e.g., campus border switch 122 of FIG. 1) may be configured to determine whether the tag is present in each received packet. If the tag is present, then the border layer switch may apply a preprogrammed rule to that packet. For example, the preprogrammed rule may be that the border layer switch drops the packet if it has an external destination and forwards the packet if it has an internal destination. Unlike the access layer switches, the border layer switches may be capable of easily distinguishing internal from external destinations—for example, they may be programmed to know which egress ports lead to an external destination and thus any packets that would be forwarded to such an egress port are known to have an external destination. On the other hand, if the tag is absent, the border layer does not apply the rule (or applies a different rule). Thus, for example, a packet without a tag may be forwarded to its destination, regardless of whether it is internal or external. In this way, the border layer switches may enforce a "catch-all" portion of a policy related to denying all external traffic other than that which is explicitly allowed. Although the border layer switch is not aware of policies that explicitly allow certain external destinations, it doesn't need to be aware of these because the access layer switch will have already applied such policies and will have omitted the tag from packets for which an "allow" policy applies, and thus these packets will be forwarded by the border gateway. In this manner, catch-all internal vs external determinations are made by the border switches and explicit per-destination allow/deny policies are enforced at the access layer switches.

Not only does the solution noted above solve the problem of access layer switches not being able to distinguish internal from external destinations, but the solution can also provide for the compaction of policies. In particular, the special tagging policy programmed at the access layer switches can be applied to any of a number of roles—in some examples all roles—rather than each policy being specified per role as would traditionally be done. This can greatly reduce the number of policy entries that need to be entered into the access layer switches.

In some examples, the tag may be inserted into a communication header of the packet and the packet with the tag may be forwarded. In some implementations, the communication header may be a VxLAN communication header having a reserved field and the tag may be inserted into the reserved field. In some implementations, the communication header may be a VxLAN communication header having a Group Policy ID field and the tag may be inserted into the Group Policy ID field.

In some implementations, the communication header further may include a Group Policy Object (GPO) or source group tag. Such a source group tag permits the restriction of traffic flowing to locations within a campus network that is not forwarded to or through a campus border switch.

The following detailed description refers to the accompanying drawings. Wherever possible, the same reference numbers are used in the drawings and the following description to refer to the same or similar parts. It is to be expressly understood, however, that the drawings are for the purpose of illustration and description only. While several examples are described in this document, modifications, adaptations, and other implementations are possible. Accordingly, the following detailed description does not limit the disclosed examples. Instead, the appended claims may define the proper scope of the disclosed examples.

Figure 1:
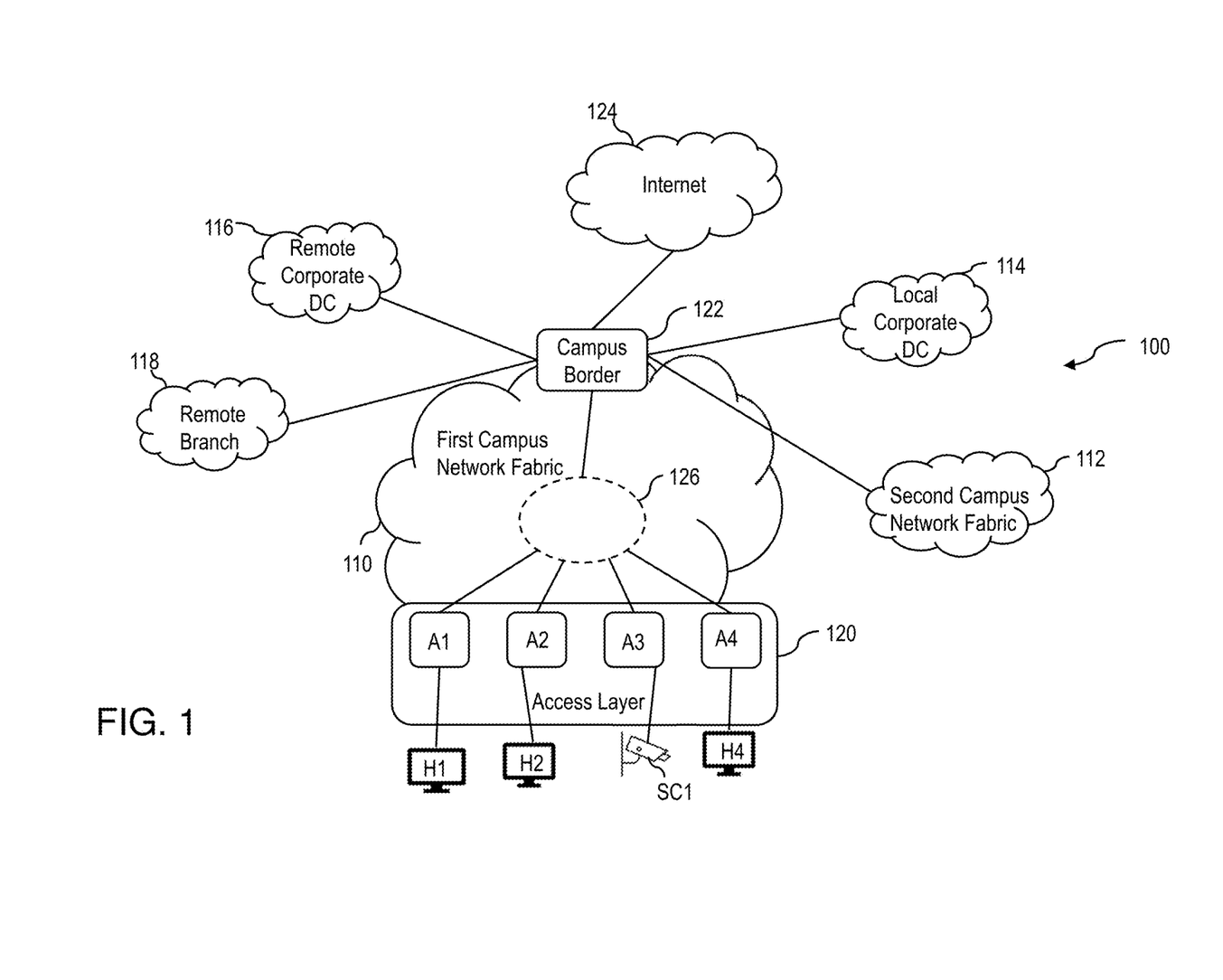
FIG. 1 is a schematic diagram of an example computing system in accordance with some implementations of the present disclosure.

FIG. 1 illustrates a multi-fabric enterprise network 100. Network 100 includes first campus network fabric 110. Network 100 may also include one or more other sub-networks or fabrics which are distinct from the first campus network fabric 110 but which are part of the same broader network 100 (e.g., they are owned or controlled by the same enterprise). In FIG. 1, these other sub-networks or fabrics comprise second campus network fabric 112, local corporate data center (DC) 114, remote corporate data center (DC) 116, and remote campus branch 118, but these are examples only and the network 100 may include any types of networks/fabrics. These networks are referred to herein as "internal networks" because they are part of the same broader network 100 and owned and/or controlled by the same entity. The first campus network fabric 110 may also be coupled to external networks, such as the internet 124 or other external networks.

The first campus network fabric 110 includes an access layer 120 having a plurality of access layer switches A1, A2, A3, and A4 to provide access points for client devices to access the first campus network fabric 110, and a campus border switch 122 to provide connections between the first campus network fabric 110 and other networks (i.e., the other internal and external networks mentioned above). In some examples, the first campus network fabric 110 also comprises intermediate networking devices 126 that handle routing of inter-fabric communications (communications between two access layer switches) and communications between the access layer 120 and the campus border 122. In other examples, campus border 122 is connected directly to the access layer 120 and/or the access layer switches A1 to A4 are directly connected to one another. Although four switches are illustrated in access layer 120 of FIG. 1, it should be understood that any number of switches may be present in association with an access layer within the scope of implementations of the present disclosure. Similarly, although one campus border switch 122 is illustrated, it should be understood that there could be multiple campus border switches. As illustrated, a client device (e.g., a desktop or mobile computing device, camera, printer, etc.) is coupled with each access layer switch. For instance, computing device H1 is coupled with access layer switch A1, computing device H2 is coupled with access layer switch A2, security camera SC1 is coupled with access layer switch A3, and computing device H3 is coupled with access layer switch A4. Although a single computing device is shown coupled with each access layer switch of FIG. 1, it should be understood that multiple computing devices may be coupled with a single access layer switch in accordance with the scope of implementations of the present disclosure. First and second campus network fabrics 110, 112, local and remote corporate data centers 114, 116, and remote campus branch 118 are accessible by computing devices A1, A2, SC1, and A3 via respective access layer switches A1, A2, A3, and A4 and campus border switch 122 (and intermediate networking devices 126, in some cases). Internet 124 also is accessible by computing devices H1, H2, SC1, and H3 via respective access layer switches A1, A2, A3, and A4 and campus border switch 122 (and intermediate networking devices 126, in some cases). However, computing devices A1, A2, SC1, and A3 may communicate with one another via respective access layer switches A1, A2, A3, and A4 (and intermediate networking devices 126, in some cases) without accessing campus border switch 122.

At least one of the access layer switches A1, A2, A3, and A4, and in some examples all of the access layer switches A1, A2, A3, and A4, are configured to receive definitions of policies, including the special traffic separation policy described above. When applied to a packet, the special traffic separation policy may cause the access layer switch A1, A2, A3, or A4 to tag the packet and forward it to the border layer switch(es). The special policy may be applied to a packet only when one of the other policies is not applicable to the packet. Thus, for example, if a packet is explicitly indicated as allowed according to one of the other policies, then it is forwarded without the tag, if a packet is explicitly denied by one of the other policies, then it is dropped, and if a packet is not covered by one of the other policies, then the packet is forwarded with the tag.

In addition, the campus border switch 122 is configured to determine whether the tag is present in each received packet. If the tag is present, then the border layer switch 122 applies a preprogrammed rule to that packet. For example, the preprogrammed rule may be that the border layer switch drops the packet if it has an external destination and forwards the packet if it has an internal destination. Unlike the access layer switches, the border layer switch 122 may be capable of easily distinguishing internal from external destinations—for example, they may be programmed to know which egress ports lead to an external destination and thus any packets that would be forwarded to such an egress port are known to have an external destination. On the other hand, if the tag is absent, the border layer switch 122 does not apply the rule (or applies a different rule).

Example configurations of the access layer switches A1 to A4 and border layer switch 122 are described in greater detail below with reference to FIGS. 2 and 3.

Figure 2:
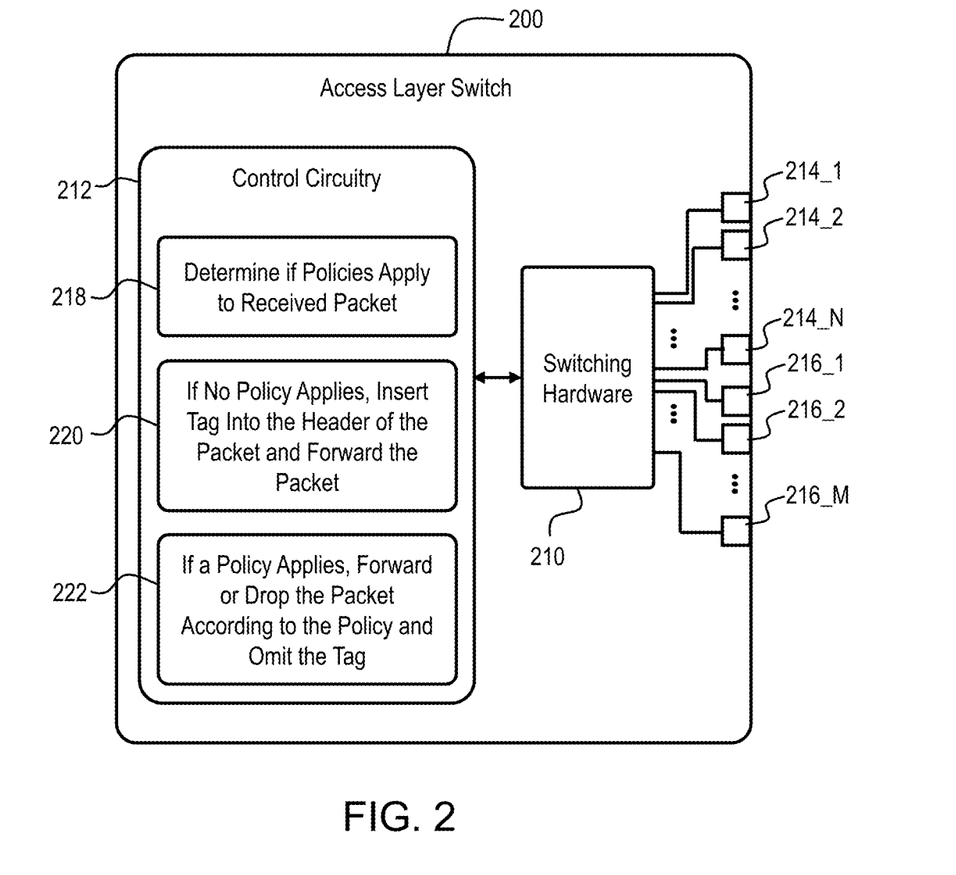
FIG. 2 is a block diagram of an example access layer switch in accordance with some implementations of the present disclosure.

FIG. 2 is a block diagram of an example access layer switch 200 in accordance with some implementations of the present disclosure. Access layer switch 200 is one configuration example of the access layer switches A1-A4 of FIG. 1. Access layer switch 200 may be configured to connect networked computing devices (e.g., computing devices H1, H2, SC1, and H4 of FIG. 1) to a network fabric (e.g., first campus network fabric 110 of FIG. 1). Access layer switch 200 includes switching hardware 210 and control circuitry 212. The switching hardware 210 comprises switching circuitry that can selectively connect ports 214 and 216 to one to allow the routing of data packets between the various devices connected to switch 200. The switching hardware 210 also may comprise other related components that participate in, control, or otherwise facilitate the communication of data packets. Switching hardware of a switch is familiar to those of ordinary skill in the art, and thus the switching hardware 210 is not described in greater detail herein.

Ports 214 and 216 comprise communication ports configured to receive a connector of a communication cable, such as an RJ45 jack that receives an Ethernet connector, an optical bay configured to receive an optical connector or optical transceiver (e.g., a QSFP module), a universal serial bus (USB) port, or any other type of electrical or optical communications port. In some examples, ports 214 may be coupled to client devices (e.g., computing devices H1, H2, SC1, and H4 of FIG. 1) or other devices in a lower layer of a network architecture while ports 216 may be coupled to higher layers of the campus network fabric (e.g., intermediate devices 126 and/or campus border switch 122 in FIG. 1) or to other access layer switches in the same access layer. Each port 214 and 216 is coupled to the control circuitry 212 (e.g., via the switching hardware 210) and is configured to communicate data between the control circuitry 212 and a device connected to the port 214 or 216. In FIG. 2 three ports 214 (i.e., ports 214_1, 214_2, 214_N) and three ports 216 (i.e., ports 216_1, 216_2, 216_M) are shown, but any number of ports 214 and 216 may be included in the switching hardware 210. Communication ports are familiar to those of ordinary skill in the art, and thus ports 214 and 216 are not described in greater detail herein.

The control circuitry 212 comprises circuitry configured (e.g., programmed) to perform operations 218-222. Though not shown in FIG. 2, the control circuitry 212 comprises a processor and a storage medium storing instructions executable by the processor to cause operations 218-222 to be performed, dedicated hardware configured to perform operations 218-222, or some combination of these. In examples in which the control circuitry 212 comprises a processor, the processor may comprise one or more processing devices capable of executing machine-readable instructions, such as, for example, a processor, a central processing unit (CPU), a controller, a microcontroller, a system-on-chip (SoC), a digital signal processor (DSP), a graphics processing unit (GPU), or other processing resources. In examples in which the control circuitry 212 includes dedicated hardware, in addition to or in lieu of the processor, the dedicated hardware may include any electronic device that is configured with logic to perform specific operations, such as an Application Specific Integrated Circuit (ASIC), a Field Programmable Gate Array (FPGA), a Complex Programmable Logic Device (CPLD), discrete logic circuits, a hardware accelerator, a hardware encoder, etc. In some examples, the control circuitry 212 may be configured to control other operations of the access layer switch 200 in addition to the operations 218-222, such as controlling operations of the switching hardware 210, security/authentication operations, and/or other operations of the switch 200. Such other operations of control circuitry are familiar to those of ordinary skill in the art and thus are not described in detail herein.

The control circuitry 212 is configured to perform operation 218, which comprises determining whether any network segmentation policies apply to one or more packets received at access layer switch 200 (e.g., from one of networked computing devices H1, H2, SC1, or H3 of FIG. 1). In some examples, the policies may have priorities associated therewith, and the control circuitry 212 may determine whether the policies apply to the packet in an order of their priority. A policy applying to a packet means that the conditions specified in the policy match the attributes of the packet, such as a role of the sender, a source address, a destination address, etc. These policies may include, for example, explicit specifications of allowed external destinations (which may be role-based, or apply to all roles), and these policies may be, in effect, exceptions to the blanket external traffic denial policy. In response to determining that no policies apply to a received packet, the control circuitry 212 is configured to perform operation 220, which comprises causing a tag to be inserted into a communication header of the packet and forwarding the packet with the tag (e.g., to campus border switch 122 and/or to its intended destination). In some implementations, access layer switch 200 may be configured to operate according to VxLAN protocols, including encapsulating packets according to such protocols. In some implementations, the encapsulation may include a VxLAN communication header. In some implementations, the VxLAN communication header may include a reserved field and the tag may be inserted into the reserved field. In some implementations, the VxLAN communication header may include a Group Policy ID field and the tag may be inserted into the Group Policy ID field.

In response to determining that a network segmentation policy does apply to the packet, the control circuitry 212 is configured to perform operation 222, which comprises forwarding or dropping the packet according to the applicable policy and omitting the tag from the packet.

In some examples, a single tag is used for all types of packets in operation 220. In other examples, there may be multiple different types of tags that can be inserted into a packet's header in operation 220, in which case the control circuitry 212 may be further configured to, in operation 220, determine which tag to insert into the packet. This determination may be made based on, for example, attributes of the packet (e.g., a role of the sender). In particular, in some examples, multiple different roles may be associated with the same given tag.

Figure 3:
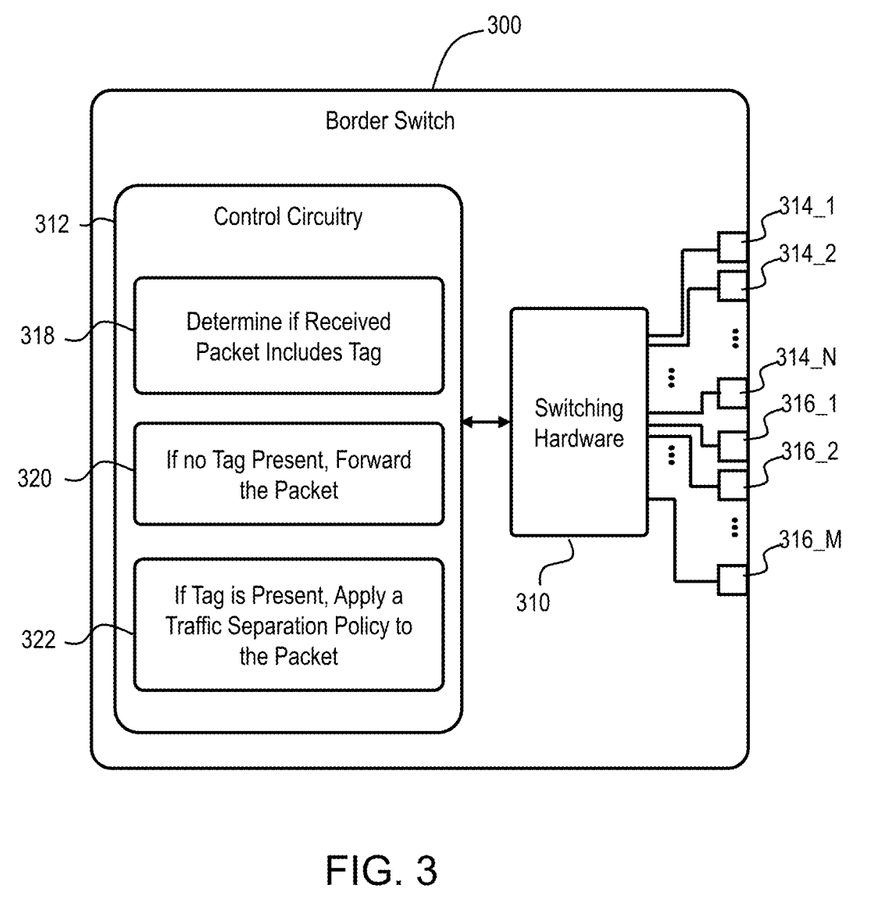
FIG. 3 is a block diagram of an example border switch in accordance with some implementations of the present disclosure.

FIG. 3 is a block diagram of an example campus border switch 300 in accordance with some implementations of the present disclosure. Campus border switch 300 is one example configuration of the campus border switch 122 illustrated in FIG. 1. Like access layer switch 200 of FIG. 2, border switch 300 includes switching hardware 310 and control circuitry 312. The switching hardware 310 comprises switching circuitry that can selectively connect ports 314 and 316 to one to allow the routing of data packets end-to-end within a network. The switching hardware 310 also may comprise other related components that participate in, control, or otherwise facilitate the communication of data packets. Switching hardware of a switch is familiar to those of ordinary skill in the art, and thus the switching hardware 310 is not described in greater detail herein.

Ports 314 and 316 comprise communication ports configured to receive a connector of a communication cable, such as an RJ45 jack that receives an Ethernet connector, an optical bay configured to receive an optical connector or optical transceiver (e.g., a QSFP module), a universal serial bus (USB) port, or any other type of electrical or optical communications port. In some examples, ports 314 may be coupled to devices in a lower layer of the network architecture (e.g., to other intermediate devices 126 in first campus network fabric 110 and/or to access layer 120) while ports 216 may be coupled to an external network (e.g., internet 124) and/or internal but remote destinations (e.g., second campus network fabric 112, local corporate DC 114, remote corporate DC 116, and/or remote branch 118). Each port 314 and 316 is coupled to the control circuitry 312 (e.g., via the switching hardware 310) and is configured to communicate data between the control circuitry 312 and a device connected to the port 314 or 316. In FIG. 3 three ports 314 (i.e., ports 314_1, 314_2, 314_N) and three ports 316 (i.e., ports 316_1, 316_2, 316_M) are shown, but any number of ports 314 and 316 may be included in the switching hardware 310. Communication ports are familiar to those of ordinary skill in the art, and thus ports 314 and 316 are not described in greater detail herein.

The control circuitry 312 comprises circuitry configured (e.g., programmed) to perform operations 318-322. Though not shown in FIG. 3, the control circuitry 312 comprises a processor and a storage medium storing instructions executable by the processor to cause operations 318-322 to be performed, dedicated hardware configured to perform operations 318-322, or some combination of these. In examples in which the control circuitry 312 comprises a processor, the processor may comprise one or more processing devices capable of executing machine-readable instructions, such as, for example, a processor, a central processing unit (CPU), a controller, a microcontroller, a system-on-chip (SoC), a digital signal processor (DSP), a graphics processing unit (GPU), or other processing resources. In examples in which the control circuitry 312 includes dedicated hardware, in addition to or in lieu of the processor, the dedicated hardware may include any electronic device that is configured with logic to perform specific operations, such as an Application Specific Integrated Circuit (ASIC), a Field Programmable Gate Array (FPGA), a Complex Programmable Logic Device (CPLD), discrete logic circuits, a hardware accelerator, a hardware encoder, etc. In some examples, the control circuitry 312 may be configured to control other operations of the campus border switch 300 in addition to the operations 318-322, such as controlling operations of the switching hardware 310, security/authentication operations, and/or other operations of the switch 300. Such other operations of control circuitry are familiar to those of ordinary skill in the art and thus are not described in detail herein.

The control circuitry 312 is configured to perform operation 318, which comprises, in response to receiving a packet (e.g., from access layer switch 200 of FIG. 2), determining whether the received packet includes a tag. The tag may be a tag associated with a blanket external traffic denial policy implemented by the campus border switch 300 in cooperation with the access layer switch that sent the packet, In some implementations, border switch 300 may be configured to operate according to VxLAN protocols. In some such implementations, the received packet may include a VxLAN communication header. In some implementations, the VxLAN communication header may include a reserved field and the tag may be included in the reserved field. In some implementations, the VxLAN communication header may include a Group Policy ID field and the tag may be included in the Group Policy ID field.

In response to determining that a received packet does not include a tag, the control circuitry 312 is configured to perform operation 320, which comprises forwarding the packet to its intended destination. In response to determining that a received packet does include a tag, the control circuitry 312 is configured to perform operation 322, which comprises applying a traffic separation policy associated with the tag to the packet. The traffic separation policy may comprise, for example, a policy to allow or deny the packet based on a destination category of the packet, such as whether the packet is destined for an internal or external destination, whether the packet is destined for a sensitive or not-sensitive destination, or some other destination-based categorization. In some examples, the traffic separation policy comprises a blanket external traffic denial policy (e.g., a policy of denying traffic destined for external destinations and allowing traffic for internal destinations). An internal destination may be a local or remote location that is affiliated with or otherwise controlled by the entity that controls the network of which the border switch 300 is a part.

The control circuitry 312 may be configured to determine which designations are external versus internal by any desired method. For example, the control circuitry 312 may know or infer that certain egress ports 314 or 316 (virtual or physical) are coupled to an external destination and may thus determine external versus internal destinations for packets based on the egress port for the packet. This knowledge may be programmed explicitly into the switch 300 (e.g., an administrator may identify which ports 314 or 316 are coupled to external destinations) or the control circuitry 312 may be configured to infer which ports 314 or 316 are for external destinations, e.g., the control circuitry 312 may regard the ports 316 (or specified ones of ports 316) as being reserved for external destinations.

In some examples, only one traffic separation policy is applied at the border switch 300 and is used for all tagged packets. In other examples, the border switch 300 may have multiple traffic separation policies programmed therein and may select which traffic separation policy to apply to a tagged packet based on the tag. That is, in some examples, multiple different tags may be used by the access layer switch (e.g., access layer switch 200), and the border switch 300 may associate those different tags with different traffic separation policies. The different tags may be associated, for example, with different groups of roles, and this may allow the border switch 300 to apply different traffic separation policies to different roles but without each role having to be individually specified with its own policy. Instead, policies need be specified at the border switch 330 only for certain groups of roles, as indicated by the tags, allowing for compaction of the number of policies programmed at the border switch 300.

Note that packets forwarded by the border switch 300 in operation 320 may include packets that are destined for a variety of destination categories (e.g., external destinations and internal destinations). In operation 320, the border switch 300 forwards these packets (because they lack the tag) without needing to determine their destination category or apply the traffic separation policy. As noted above, at the access layer switch the tag is omitted when a policy is found to be applicable to a packet, and therefore when the border switch 300 receives a packet without a tag, the border layer switch 300 can know that it does not need to apply further policies to that packet because a policy has already been applied thereto at the access layer. This allows, for example, a specific exception to a catch-all denial rule to be efficiently implemented. For example, if the traffic separation policy applied at the border switch 300 to tagged packets comprises a policy to deny all packets destined for external destinations, a policy to allow exceptions for certain specified external destinations (e.g., certain allowed websites) may be implemented by programming specific "allow" rules for those limited destinations at the access switches 200. This will cause packets directed to those explicitly allowed destinations to be forwarded to the border switch 300 without a tag, and the border switch 300 will thus forward those packets onward in operation 320 without applying the catch-all denial rule.

Above, denial of external traffic and allowance of internal traffic are described as examples, but the traffic separation policy applied in operation 322 may distinguish between other types of destination categories. For example, some types of destinations may be classified as sensitive, such as a second campus network fabric 112, for example, which may contain restricted items not generally available to all users, and the traffic separation policy applied in operation 322 may deny tagged packets destined for the sensitive destinations. Moreover, the border switch 300 may be configured to apply multiple such traffic separation policies in operation 322. For example, one traffic separation policy may deny tagged traffic destined to an external destination, and another traffic separation policy may deny tagged traffic destined to a sensitive destination, and traffic that is destined for neither external nor sensitive destinations may be allowed.

Figure 4:
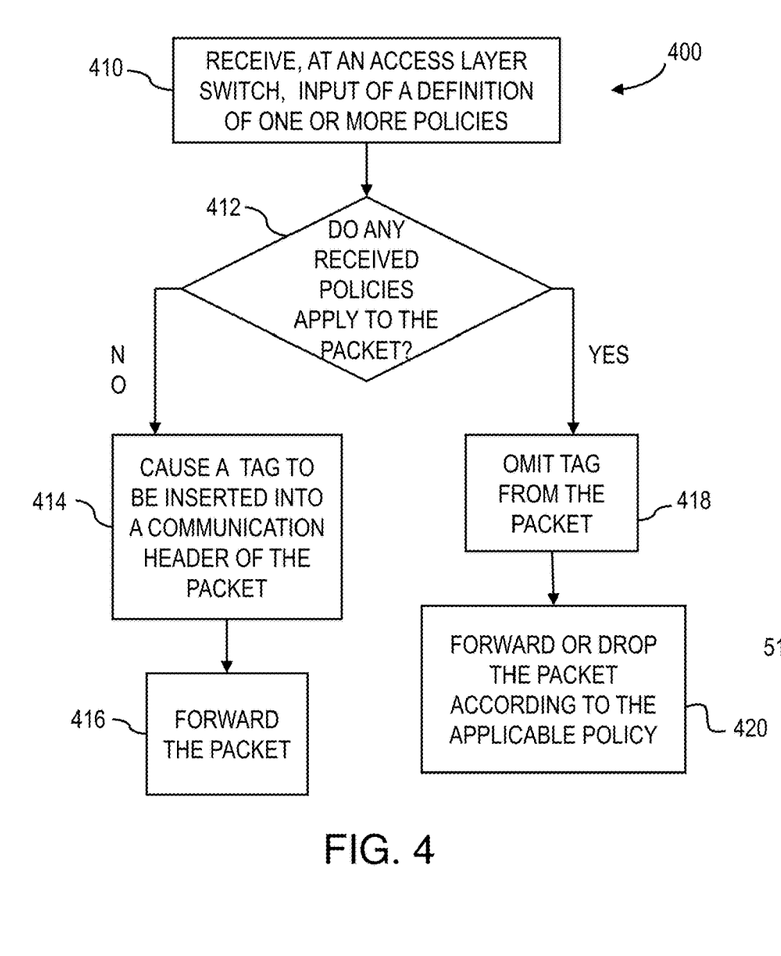
FIG. 4 is a flow diagram showing an illustrative method for compacting traffic separation policies at an access layer switch in accordance with some implementations of the present disclosure.

FIG. 4 is a flow diagram showing an illustrative method 400 for compacting traffic separation policies at an access layer switch in accordance with some implementations of the present disclosure. Method 400 may be performed, for example, by one of the access layer switches A1-A4 of FIG. 1 and/or the access layer switch 200 of FIG. 2.

At step 410, input of a definition of one or more policies may be received at an access layer switch. The one or more policies may include, by way of example only, a policy specifying internal and/or external destinations to which a packet may or may not be forwarded, a policy specifying certain sensitive and/or non-sensitive destinations to which a packet may or may not be forwarded, a policy specifying certain destination-specific exceptions to a general catch-all denial of traffic, or the like. In some implementations, the policies may have priorities associated therewith specifying an order in which they are to be applied.

At step 412, in response to receiving a packet, it may be determined (by processing at the access layer switch) whether any of the policies defined in step 410 apply to the received packet. A policy applies to a received packet when the conditions specified in the policy match the attributes of the packet, such as a role of the sender, a source address, a destination address, etc. Where more than one policy is received at the access layer switch, whether a policy applies to a received packet may be determined for each policy. Where more than one policy is received and one or more of the policies has a priority associated therewith, whether a policy applies to a received packet may be determined iteratively, for example, applying higher priority policies prior to lower priority policies, or where a higher-priority policy is determined to apply, not considering any lower-priority policies.

At step 414, in response to determining that none of the policies apply to the received packet, processing at the access layer switch may cause a tag to be inserted into a communication header of the packet. In some implementations, where the access layer switch is configured to operate according to VxLAN protocols, processing at the access layer switch may cause the tag may be inserted into a VxLAN communication header. In some implementations, the VxLAN communication header may include a reserved field and the tag may be inserted into the reserved field. In some implementations, the VxLAN communication header may include a Group Policy ID field and the tag may be inserted into the Group Policy ID field.

At step 416, the packet with the tag may be forwarded by the access layer switch, e.g., to a campus border switch, for further processing.

In response to determining, at step 412, that at least one of the policies for which definitions were received applies to the received packet, at step 418, processing at the access layer switch may cause the tag to be omitted from the communication header of the packet.

At step 420, the packet may be forwarded or dropped, by the access layer switch, in accordance with the applicable policy(ies).

Figure 5:
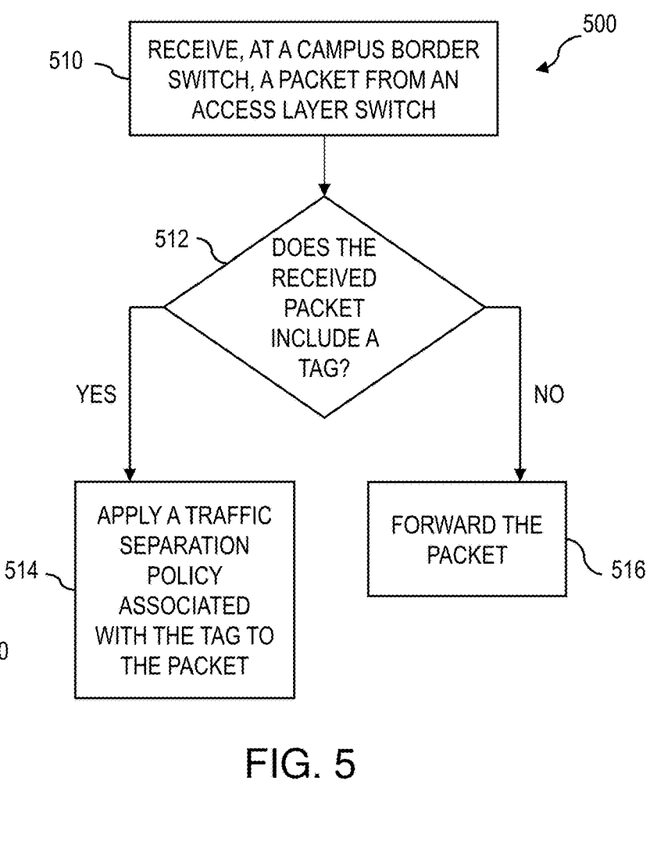
FIG. 5 is a flow diagram showing an illustrative method for compacting traffic separation policies at a campus border switch in accordance with an example implementation of the present disclosure.

FIG. 5 is a flow diagram showing an illustrative method 500 for compacting traffic separation policies at a campus border switch in accordance with an example implementation of the present disclosure. Method 500 may be performed, for example, by the campus border switch 122 of FIG. 1 and/or the campus border switch 300 of FIG. 3.

At step 510, a packet may be received at a campus border switch from an access layer switch (e.g., access layer switch A1, A2, A3, or A4 of FIG. 1 and/or access layer switch 200 of FIG. 2).

At step 512, in response to receiving the packet, processing at the campus border switch may determine whether the received packet includes a tag (e.g., in the communication header thereof). In implementations where the access layer switch is configured to operate according to VxLAN protocols, processing at the campus border switch may examine a VxLAN communication header, a reserved field of a VxLAN communication header, and/or a Group Policy ID field of a VxLAN communication header to determine whether the received packet includes a tag.

At step 514, in response to determining that the received packet includes a tag, processing at the campus border switch may apply a traffic separation policy associated with the tag to the packet. The traffic separation policy may be, for example, a policy to allow or deny the packet to be forwarded based on a destination category of the packet, such as whether the packet is destined for an internal or external destination, whether the packet is destined for a sensitive or not-sensitive destination, or some other destination-based categorization. In some examples, the traffic separation policy comprises denying traffic destined for external destinations and allowing traffic for internal destinations. An internal destination may be a local or remote location that is affiliated with or otherwise controlled by the entity that controls the network of which the campus border switch is a part. Methods 600, 700, and 800, illustrated in FIGS. 6-8 and described below, comprise some examples of applying a traffic separation policy.

At step 516, in response to determining that the received packet does not include a tag, processing at the campus border switch may forward the packet to its intended destination.

Figure 6:
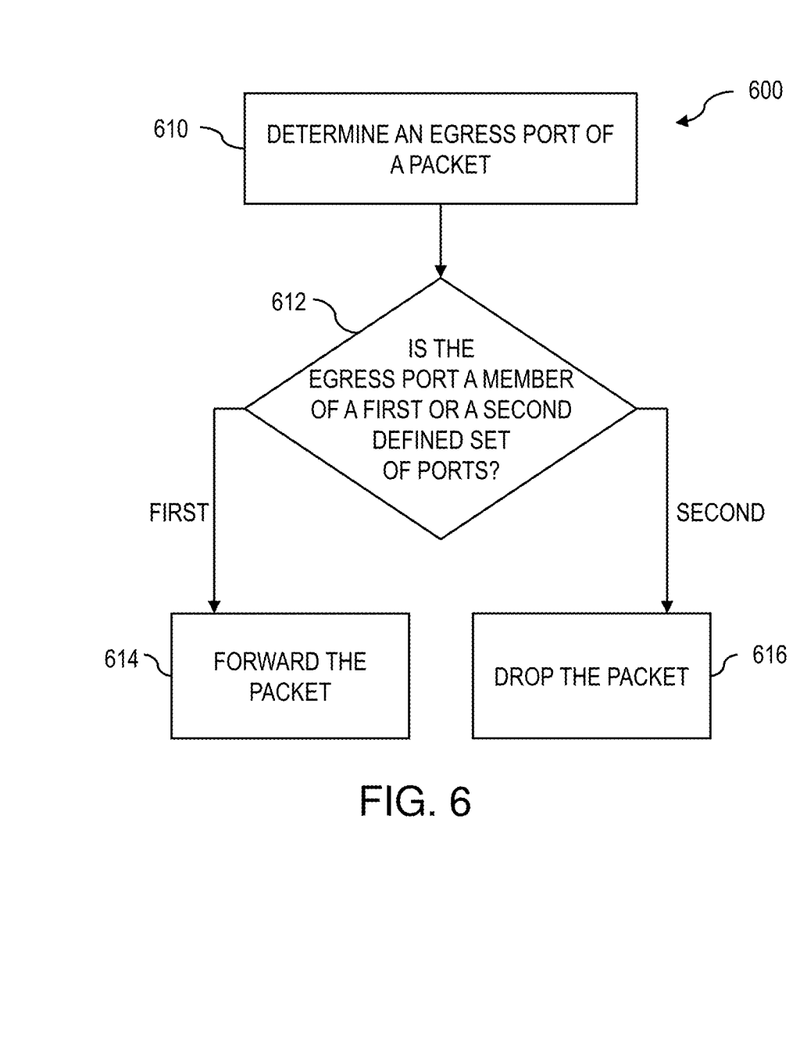
FIG. 6 is a flow diagram showing an illustrative method for applying a traffic separation policy associated with a tag to a packet in accordance with an example implementation of the present disclosure.

FIG. 6 is a flow diagram showing an illustrative method 600 for applying a traffic separation policy associated with a tag to a packet in accordance with an example implementation of the present disclosure. Method 600 may be one example of applying a traffic separation policy in accordance with step 514 of method 500. Method 600 may be performed, for example, by the campus border switch 122 of FIG. 1 and/or the campus border switch 300 of FIG. 3.

At step 610, processing at a campus border switch may determine an egress port of a received packet. An egress port of the received packet may be determined as the port through which the received packet is intended to be forwarded.

At step 612, processing at the campus border switch may determine whether the egress port is a member of a first-defined set of ports or a second-defined set of ports. The egress ports may be physical ports or virtual ports (e.g., VxLAN tunnel endpoints). The sets of defined ports may be defined by a manufacturer or developer, may be user configurable, or both. For example, the first set of ports may be ports that are associated with a certain category of destinations while the second set of ports is associated with a different category of destinations. For example, the first set of ports may be explicitly or implicitly reserved for internal destinations while the second set of ports may be explicitly or implicitly reserved for external destinations. For example, with reference to the border switch 300, in one implementation the first set of ports may be defined to include the ports 314 and the second set of ports may be defined to include the ports 316.

At step 614, upon determining that the egress port is a member of the first-defined set of ports, processing at the campus border switch may forward the packet to its intended destination.

At step 616, upon determining that the egress port is a member of the second-defined set of ports, processing at the campus border switch may drop the packet.

Figure 7:
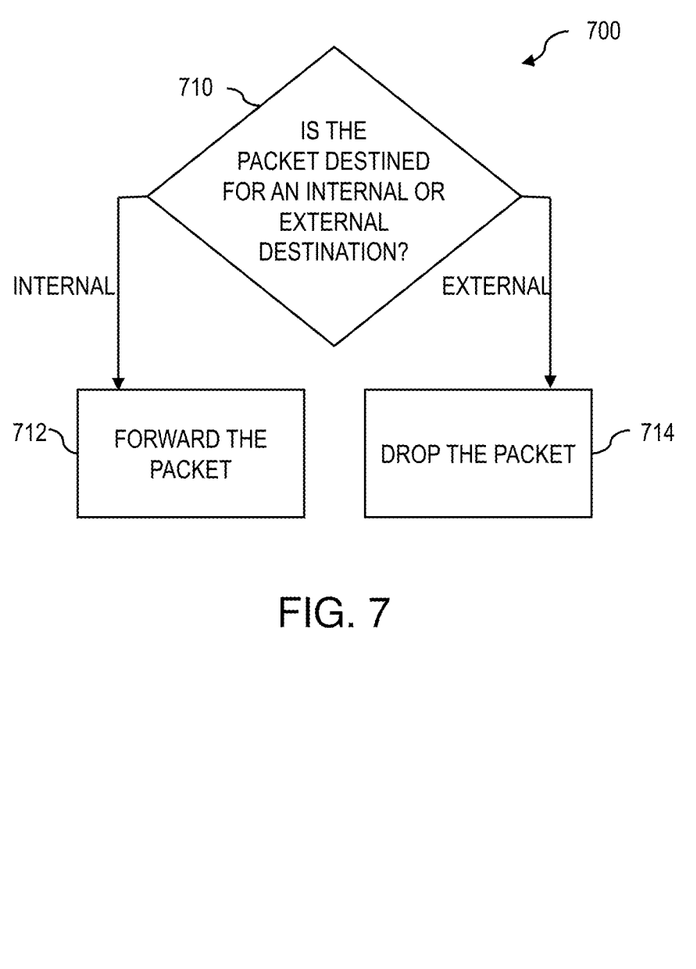
FIG. 7 is a flow diagram showing another illustrative method for applying a traffic separation policy associated with a tag to a packet in accordance with an example implementation of the present disclosure.

FIG. 7 is a flow diagram showing another illustrative method 700 for applying a traffic separation policy associated with a tag to a packet in accordance with an example implementation of the present disclosure. Method 700 may be one example of applying a traffic separation policy in accordance with step 514 of method 500. Method 700 may be performed, for example, by the campus border switch 122 of FIG. 1 and/or the campus border switch 300 of FIG. 3.

At step 710, processing at a campus border switch may determine whether a received packet is destined for an internal destination or an external destination.

At step 712, upon determining that the received packet is destined for an internal destination, processing at the campus border switch may forward the packet to its intended internal destination.

At step 714, upon determining that the received packet is destined for an external destination, processing at the campus border switch may drop the packet.

Figure 8:
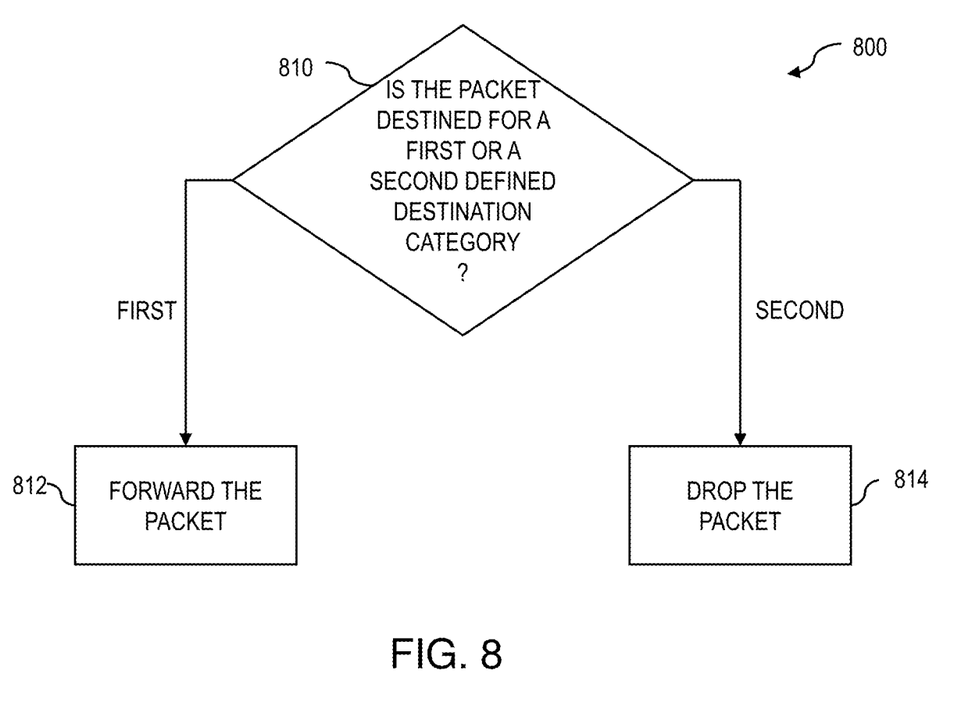
FIG. 8 is a flow diagram showing yet another illustrative method for applying a traffic separation policy associated with a tag to a packet in accordance with an example implementation of the present disclosure.

FIG. 8 is a flow diagram showing yet another illustrative method 800 for applying a traffic separation policy associated with a tag to a packet in accordance with an example implementation of the present disclosure. Method 800 may be one example of applying a traffic separation policy in accordance with step 514 of method 500. Method 800 may be performed, for example, by the campus border switch 122 of FIG. 1 and/or the campus border switch 300 of FIG. 3.

At step 810, processing at a campus border switch may determine whether a received packet is destined for a first-defined destination category or a second-defined destination category. By way of example only, the first-defined destination category may be internal destinations and the second-defined destination category may be external destinations, the first-defined destination category may be non-sensitive destinations and the second-defined destination category may be sensitive destinations, the first-defined destination category may be destinations to which users having a certain role may be permitted to forward traffic and the second-defined destination category may be destinations to which users having the certain role may not be permitted to forward traffic, and/or any combination thereof.

At step 812, upon determining that the received packet is destined for the first-defined destination category, processing at the campus border switch may forward the packet to its intended destination.

At step 814, upon determining that the received packet is destined for the second-defined destination category, processing at the campus border switch may drop the packet.

Figure 9:
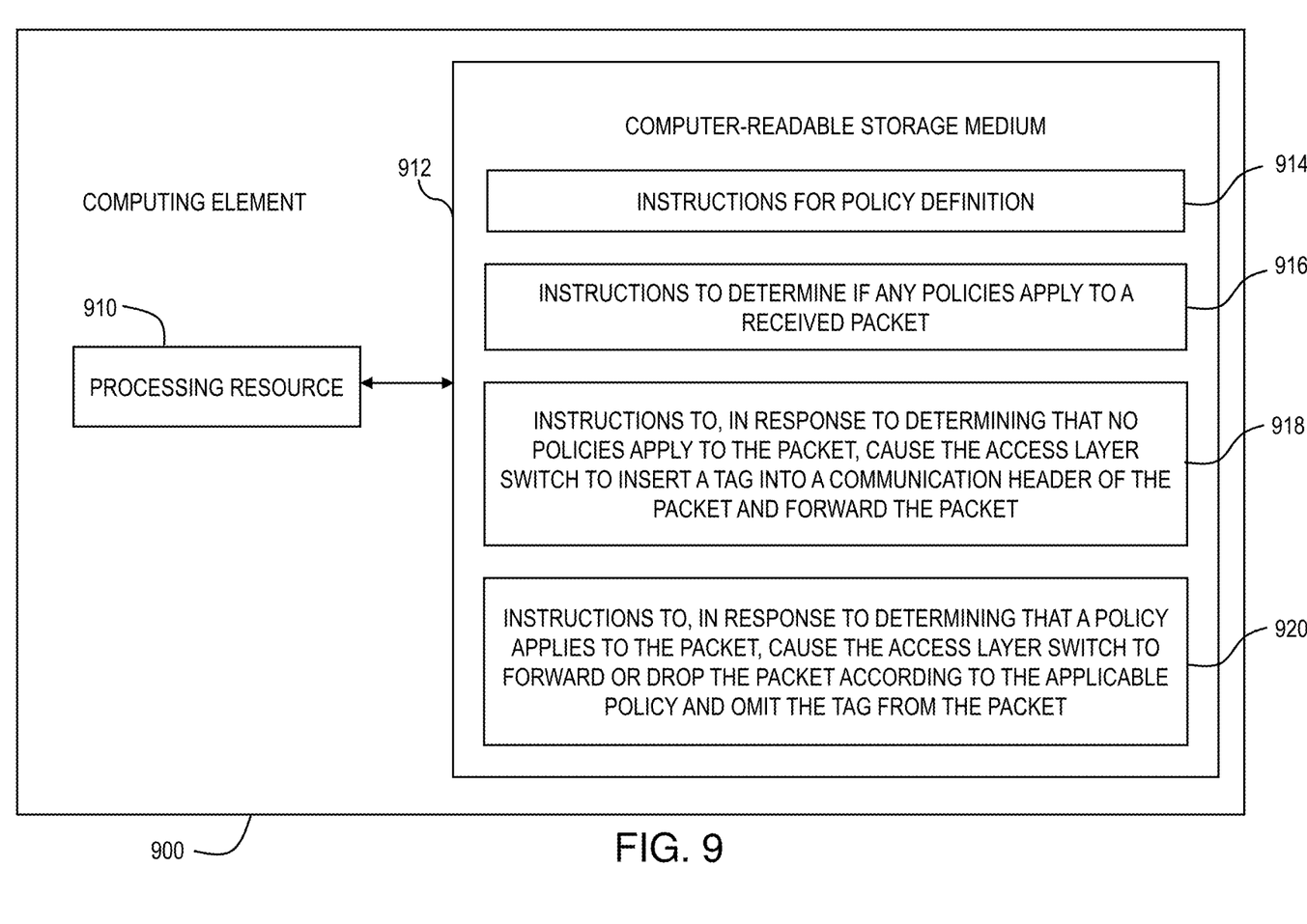
FIG. 9 is a block diagram showing an example computing element (e.g., an access layer switch) in accordance with some implementations of the present disclosure.

FIG. 9 is a block diagram showing an example computing element 900 (e.g., an access layer switch), in accordance with some implementations of the present disclosure. In the example illustrated in FIG. 9, the computing device 900 includes a processing resource 910 coupled with a non-transitory, computer-readable storage medium 912 encoded with computer-executable instructions to perform compaction of traffic separation policies in campus network architectures. The processing resource 910 may include a microcontroller, a microprocessor, central processing unit core(s), graphical processing unit core(s), an application-specific integrated circuit (ASIC), a field programmable gate array (FPGA), and/or another hardware device suitable for retrieval and/or execution of instructions from the computer-readable storage medium 912 to perform the functions related to various examples described herein. Additionally, or alternatively, the processing resource 910 may include electronic circuitry for performing the functionality of the instructions described herein.

The computer-readable storage medium 912 may be any medium suitable for storing executable instructions. Non-limiting examples of computer-readable storage medium 912 include RAM, ROM, EEPROM, flash memory, a hard disk drive, an optical disc, or the like. The computer-readable medium storage 912 may be disposed within the computing element 900, as shown in FIG. 9, in which case the executable instructions may be deemed "installed" or "embedded" on the computing element 900. Alternatively, the computer-readable storage medium 912 may be a portable (e.g., external) storage medium, and may be part of an "installation package." The instructions stored on the computer-readable storage medium 912 may be useful for implementing at least the methods described herein (e.g., the method shown in FIG. 4).

In the context of the present example, the computer-readable storage medium 912 is encoded with a set of executable instructions 914-920. It should be understood that part or all of the executable instructions and/or electronic circuits included within one block may, in alternate implementations, be included in a different block shown in the figures or in a different block not shown.

Instructions 914, upon execution, may cause the processing resource 910 to receive input of a definition of one or more policies. The one or more policies may include, by way of example only, a policy specifying internal and/or external destinations to which a packet may or may not be forwarded, a policy specifying certain sensitive and/or non-sensitive destinations to which a packet may or may not be forwarded, a policy specifying certain destination-specific exceptions to a general catch-all denial of traffic, or the like. In some implementations, the policies may have priorities associated therewith specifying an order in which they are to be applied.

Instructions 916, upon execution, may cause the processing resource 910 to, in response to receiving a packet (e.g., a VxLAN packet), determine whether any of the received policies apply to the packet. A policy may be determined to apply to a received packet when the conditions specified in the policy match the attributes of the packet, such as a role of the sender, a source address, a destination address, etc. Where more than one policy is received at the access layer switch, whether a policy applies to a received packet may be determined for each policy. Where more than one policy is received and one or more of the policies has a priority associated therewith, whether a policy applies to a received packet may be determined iteratively, for example, applying higher priority policies prior to lower priority policies, or where a higher-priority policy is determined to apply, not considering any lower-priority policies.

Instructions 918, upon execution, may cause the processing resource 910 to, in response to determining that none of the received policies apply to the VxLAN packet, cause a tag to be inserted into a communication header of the VxLAN packet. In some implementations, the VxLAN communication header may include a reserved field and the tag may be inserted into the reserved field. In some implementations, the VxLAN communication header may include a Group Policy ID field and the tag may be inserted into the Group Policy ID field.

Instructions 920, upon execution, may cause the processing resource 910 to, upon determining that at least one of the policies applies to the packet, forward or drop the packet according to the applicable policy and omit the tag from the VxLAN packet.

Figure 10:
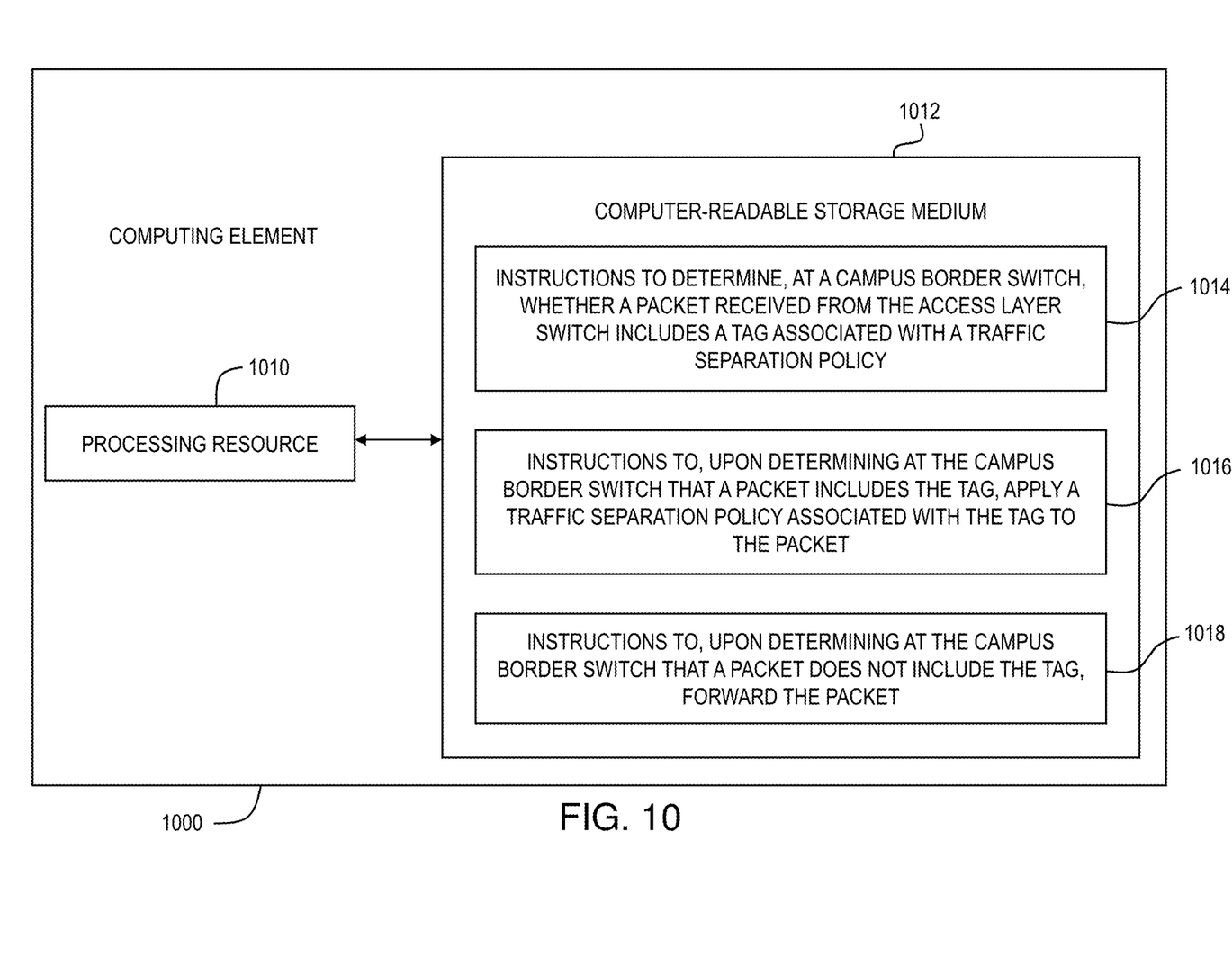
FIG. 10 is a block diagram showing an example computing element (e.g., a campus border switch), in accordance with some implementations of the present disclosure.

FIG. 10 is a block diagram showing an example computing element 1000 (e.g., a campus border switch), in accordance with some implementations of the present disclosure. In the example illustrated in FIG. 10, the computing device 1000 includes a processing resource 1010 coupled with a non-transitory, computer-readable storage medium 1012 encoded with computer-executable instructions to perform compaction of traffic separation policies in campus network architectures. The processing resource 1010 may include a microcontroller, a microprocessor, central processing unit core(s), graphical processing unit core(s), an application-specific integrated circuit (ASIC), a field programmable gate array (FPGA), and/or another hardware device suitable for retrieval and/or execution of instructions from the computer-readable storage medium 1012 to perform the functions related to various examples described herein. Additionally, or alternatively, the processing resource 1010 may include electronic circuitry for performing the functionality of the instructions described herein.

The computer-readable storage medium 1012 may be any medium suitable for storing executable instructions. Non-limiting examples of computer-readable storage medium 1012 include RAM, ROM, EEPROM, flash memory, a hard disk drive, an optical disc, or the like. The computer-readable medium storage 1012 may be disposed within the computing element 1000, as shown in FIG. 10, in which case the executable instructions may be deemed "installed" or "embedded" on the computing element 1000. Alternatively, the computer-readable storage medium 1012 may be a portable (e.g., external) storage medium, and may be part of an "installation package." The instructions stored on the computer-readable storage medium 1012 may be useful for implementing at least the methods described herein (e.g., the methods shown in FIGS. 5-8).

In the context of the present example, the computer-readable storage medium 1012 is encoded with a set of executable instructions 1014-1018. It should be understood that part or all of the executable instructions and/or electronic circuits included within one block may, in alternate implementations, be included in a different block shown in the figures or in a different block not shown.

Instructions 1014, upon execution, may cause the processing resource 1010 to, in response to receiving a packet from the access layer switch, cause the border switch to determine whether the received packet includes a tag in the communication header thereof, wherein the tag is associated with a traffic separation policy (e.g., a blanket external traffic denial policy). In some examples, the tag indicates that no traffic separation policies were found applicable to the packet at the access layer switch. In some examples, the tag may also be associated with a specific traffic separation policy out of plural traffic separation policies that the campus border switch may apply. In implementations where the packet is a VxLAN packet, the processing resource 910 may be caused to examine a VxLAN communication header, a reserved field of a VxLAN communication header, and/or a Group Policy ID field of a VxLAN communication header to determine whether the received packet includes a tag.

Instructions 1016, upon execution, may cause the processing resource 1010 to, in response to determining that the received packet includes a tag, apply the traffic separation policy associated with the tag to the packet. The traffic separation policy may be, for example, a policy to allow or deny the packet to be forwarded based on a destination category of the packet, such as whether the packet is destined for an internal or external destination, whether the packet is destined for a sensitive or not-sensitive destination, or some other destination-based categorization. In some examples, the traffic separation policy comprises denying traffic destined for external destinations and allowing traffic for internal destinations. An internal destination may be a local or remote location that is affiliated with or otherwise controlled by the entity that controls the network of which the campus border switch is a part.

Instructions 1018, upon execution, may cause the processing resource 1020, in response to determining that the packet does not include a tag, forward the packet to its intended destination. In particular, in some examples when there is no tag, the packet is forwarded to its intended destination without considering whether any other traffic separation policies apply.

The processing described herein with reference to FIGS. 1 through 10 may be implemented in the form of executable instructions stored on a machine-readable medium and executed by a processing resource (e.g., a microcontroller, a microprocessor, central processing unit core(s), an application-specific integrated circuit (ASIC), a field programmable gate array (FPGA), and the like) and/or in the form of other types of electronic circuitry. For example, this processing may be performed by one or more computing systems or elements of various forms, such as the system described above with reference to FIG. 1.

The technology described herein includes various steps, examples of which have been described above. As described further above, these steps may be performed by hardware components or may be embodied in machine-executable instructions, which may be used to cause a processor programmed with the instructions to perform the steps. Alternatively, at least some steps may be performed by a combination of hardware, software, and/or firmware.

The technology described herein may be provided as a computer program product, which may include a tangible machine-readable storage medium embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other types of media/machine-readable medium suitable for storing electronic instructions (e.g., computer programming code, such as software or firmware).

In the technical description herein, numerous specific details are set forth in order to provide a thorough understanding of example implementations. It will be apparent, however, to one skilled in the art that implementations described herein may be practiced without some of these specific details. In other instances, well-known structures and devices are shown in block diagram form.

The terminology used herein is for the purpose of describing example implementations only and is not intended to be limiting. As used herein, the singular forms "a," "an," and "the" are intended to include the plural forms as well, unless the context clearly indicates otherwise. The term "plurality," as used herein, is defined as two, or more than two. The term "and/or" as used herein refers to and encompasses any and all possible combinations of one or more of the associated listed items. As used herein, the term "includes" means includes but not limited to, and the term "including" means including but not limited to. The term "based on" means based at least in part on. If the specification states a component or feature "may," "can," "could," or "might" be included or have a characteristic, that particular component or feature is not required to be included or have the characteristic. As used in the description herein, the meaning of "in" includes "in" and "on" unless the context clearly dictates otherwise.

Various methods described herein may be practiced by combining one or more machine-readable storage media containing the code according to example embodiments described herein with appropriate standard computer hardware to execute the code contained therein. An apparatus for practicing various embodiments described herein may involve one or more computing elements or computers (or one or more processors within a single computer) and storage systems containing or having network access to computer program(s) coded in accordance with various methods described herein, and the method steps of various embodiments described herein may be accomplished by modules, routines, subroutines, or subparts of a computer program product.

In the foregoing description, numerous details are set forth to provide an understanding of the subject matter disclosed herein. However, implementations may be practiced without some or all of these details. Other implementations may include modifications and variations from the details discussed above. It is intended that the following claims cover such modifications and variations.

What is claimed is:

1. A system for traffic separation in campus network architectures, comprising:
   hardware resources;
   an access layer switch comprising or formed by one or more of the hardware resources, the access layer switch configured to:
      receive input of a definition of one or more access layer traffic separation policies;
      in response to receiving a packet, determine whether any of the access layer traffic separation policies apply to the packet;
      in response to determining that none of the access layer traffic separation policies apply to the packet, cause a tag to be inserted into a communication header of the packet and forward the packet; and
      in response to determining that one of the access layer traffic separation policies applies to the packet, forward or drop the packet according to the access layer traffic separation policy determined to apply to the packet and omit the tag from the packet; and
   a campus border switch comprising or formed by one or more of the hardware resources, the campus border switch configured to:
      in response to receiving a packet from the access layer switch, determine whether the received packet includes the tag, and
      in response to determining that the received packet includes the tag, apply a border traffic separation policy associated with the tag to the packet.

2. The system of claim 1, wherein the access layer traffic separation policies include one or more policies explicitly specifying destinations that are allowed or denied.

3. The system of claim 2, wherein at least a portion of the access layer traffic separation policies are role-based policies.

4. The system of claim 1, wherein the campus border switch is configured to, in response to determining that the received packet does not include the tag, forward the packet.

5. The system of claim 1, wherein applying the border traffic separation policy associated with the tag to the packet comprises:
determining an egress port of the packet;
forwarding the packet if the egress port is a member of a first defined set of ports; and
dropping the packet if the egress port is a member of a second defined set of ports.

6. The system of claim 5, wherein the campus border switch is configured to, in response to determining that the received packet does not include the tag, forward the packet regardless of which egress port the packet is to be forwarded through.

7. The system of claim 1, wherein applying the border traffic separation policy associated with the tag to the packet comprises:
determining whether the packet is destined for an internal destination or an external destination,
forwarding the packet if the packet is destined for an internal destination, and
dropping the packet if the packet is destined for an external destination.

8. The system of claim 1, wherein applying the border traffic separation policy associated with the tag to the packet comprises:
determining whether the packet is destined for a first defined destination category or a second defined destination category;
forwarding the packet if the packet is destined to the first defined destination category; and
dropping the packet if the packet is destined for the second defined destination category.

9. The system of claim 1, wherein the communication header is a virtual extensible local area network (VXLAN) header having a reserved field, and wherein the tag is inserted into the reserved field.

10. The system of claim 1, wherein the communication header is a VXLAN header having a Group Policy ID field, and wherein the tag is inserted into the Group Policy ID field.

11. The system of claim 1, wherein the communication header further comprises a source group tag.

12. A method for traffic separation in campus network architectures, comprising:
at an access layer switch:
receiving input of a definition of one or more access layer traffic separation policies;
in response to receiving a virtual extensible local area network (VXLAN) packet, determining whether any of the received access layer traffic separation policies apply to the VXLAN packet;
in response to determining that none of the received access layer traffic separation policies apply to the VXLAN packet, cause a tag to be inserted into a communication header of the VXLAN packet and forward the VXLAN packet; and
in response to determining that one of the access layer traffic separation policies applies to the VXLAN packet, forward or drop the VXLAN packet according to the access layer traffic separation policy determined to apply to the packet and omit the tag from the VXLAN packet.

13. The method of claim 12, wherein at least a portion of the one or more access layer traffic separation policies explicitly specify destinations that are allowed or denied.

14. The method of claim 12, wherein at least a portion of the access layer traffic separation policies are role-based policies.

15. The method of claim 12, wherein the communication header comprises a reserved field, and wherein the tag is inserted into the reserved field.

16. The method of claim 12, wherein the communication header comprises a Group Policy ID field, and wherein the tag is inserted into the Group Policy ID field.

17. A non-transitory computer-readable medium having stored thereon, a set of computer-executable instructions for causing one or more processors of a computing system to:
receive, at a border switch of a campus network architecture, a packet from an access layer switch of the campus network architecture;
in response to receiving the packet from the access layer switch, cause the border switch to determine whether the packet includes a tag in the communication header thereof, wherein the tag is associated with a blanket external traffic denial policy; and
in response to determining that the packet includes the tag, apply the blanket external traffic denial policy associated with the tag to the packet, wherein the blanket external traffic denial policy instructs the border switch to:
determine whether the packet is destined for an internal destination or an external destination,
forward the packet if the packet is destined for an internal destination, and
drop the packet if the packet is destined for an external destination.

18. The computer-readable storage medium of claim 17, wherein the blanket external traffic denial policy is a role-based traffic separation policy.

19. The computer-readable storage medium of claim 17, wherein applying the blanket external traffic denial policy associated with the tag to the packet comprises:
determining an egress port of the packet;
forwarding the packet if the egress port is a member of a first defined set of ports; and
dropping the packet if the egress port is a member of a second defined set of ports.

20. The computer-readable storage medium of claim 17, wherein the set of computer-executable instructions cause the one or more processors of the computing system to, in response to determining at the border switch of the campus network architecture that the packet does not include the tag, forward the packet regardless of which egress port the packet is to be forwarded through.

* * * * *